United States Patent
Raveendran et al.

(10) Patent No.: US 9,942,606 B2
(45) Date of Patent: Apr. 10, 2018

(54) APPLICATION LAYER MODIFICATION TO ENABLE TRANSMISSION GAPS

(75) Inventors: Vijayalakshmi R. Raveendran, San Diego, CA (US); PhaniKumar K. Bhamidipati, San Diego, CA (US); James T. Determan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 816 days.

(21) Appl. No.: 12/984,038

(22) Filed: Jan. 4, 2011

(65) Prior Publication Data

US 2011/0164177 A1    Jul. 7, 2011

Related U.S. Application Data

(60) Provisional application No. 61/292,391, filed on Jan. 5, 2010, provisional application No. 61/298,494, filed
(Continued)

(51) Int. Cl.
*H04N 5/38* (2006.01)
*H04N 7/04* (2006.01)
(Continued)

(52) U.S. Cl.
CPC .  *H04N 21/440218* (2013.01); *H04N 21/4344* (2013.01); *H04N 21/4346* (2013.01); *H04N 21/43637* (2013.01)

(58) Field of Classification Search
None
See application file for complete search history.

(56) References Cited

U.S. PATENT DOCUMENTS

| 4,079,380 | A | 3/1978 | Esry et al. |
| 7,483,717 | B2 | 1/2009 | Champion et al. |

(Continued)

FOREIGN PATENT DOCUMENTS

| CN | 1288335 A | 3/2001 |
| CN | 1658532 A | 8/2005 |

(Continued)

OTHER PUBLICATIONS

Akyildiz I F, et al., "CRAHNs: Cognitive radio ad hoc networks", Ad Hoc Networks, Elsevier, vol. 7, No. 5, Jul. 1, 2009 (Jul. 1, 2009), pp. 810-836, XP025952200, ISSN: 1570-8705, DOI: DOI:10.1016/J.ADH0C.2009.01.001 [retrieved on Jan. 14, 2009].

(Continued)

*Primary Examiner* — Edemio Navas, Jr.
(74) *Attorney, Agent, or Firm* — Seyfarth Shaw LLP

(57) ABSTRACT

Television white space devices are operable to communicate information over television white space and, more specifically, to quiet a transmitter for sensing signals in the television white space. A method for inconspicuous quieting of the transmitter in a television white space device inserts, from an application layer, information into a transport stream for transmission by the transmitter of the television white space device to produce a null window of time within the transport stream at a predetermined time. The method also transmits the transport stream by the transmitter of the television white space device and quiets the transmitter during the null window of time. The method senses, by a white space sensor of the television white space device, existing signals in the white space during the null window of time.

17 Claims, 5 Drawing Sheets

Related U.S. Application Data on Jan. 26, 2010, provisional application No. 61/309,534, filed on Mar. 2, 2010.

(51) Int. Cl.
| | |
|---|---|
| *H04N 21/4402* | (2011.01) |
| *H04N 21/434* | (2011.01) |
| *H04N 21/4363* | (2011.01) |

(56) References Cited

U.S. PATENT DOCUMENTS

| | | | |
|---|---|---|---|
| 7,573,907 B2* | 8/2009 | Lakaniemi | 370/468 |
| 8,031,807 B2 | 10/2011 | Shellhammer | |
| 2005/0036519 A1* | 2/2005 | Balakrishnan et al. | 370/503 |
| 2005/0169181 A1 | 8/2005 | Kim et al. | |
| 2005/0190822 A1* | 9/2005 | Fujii et al. | 375/211 |
| 2006/0291545 A1* | 12/2006 | Lau | H04L 5/1423 375/220 |
| 2007/0204320 A1* | 8/2007 | Wu et al. | 725/135 |
| 2007/0248076 A1* | 10/2007 | Ji | H04L 27/2613 370/350 |
| 2007/0279267 A1* | 12/2007 | Mukaide | G11B 20/00007 341/95 |
| 2008/0090581 A1* | 4/2008 | Hu | 455/452.1 |
| 2008/0101369 A1* | 5/2008 | Sandoz | H04L 69/14 370/392 |
| 2008/0130519 A1 | 6/2008 | Bahl et al. | |
| 2008/0146159 A1* | 6/2008 | Faltman et al. | 455/67.11 |
| 2008/0165754 A1 | 7/2008 | Hu | |
| 2008/0279226 A1 | 11/2008 | Laud | |
| 2008/0293353 A1 | 11/2008 | Mody et al. | |
| 2009/0047916 A1 | 2/2009 | Haykin | |
| 2010/0003922 A1 | 1/2010 | Zhou et al. | |
| 2010/0008385 A1 | 1/2010 | Noronha, Jr. | |
| 2010/0172634 A1 | 7/2010 | Devictor et al. | |
| 2010/0254682 A1* | 10/2010 | Masuno et al. | 386/109 |
| 2011/0096770 A1* | 4/2011 | Henry | H04W 72/0446 370/352 |
| 2011/0124291 A1* | 5/2011 | Gurney | H04W 16/14 455/63.2 |
| 2011/0164176 A1 | 7/2011 | Raveendran et al. | |
| 2011/0299509 A1 | 12/2011 | Wang et al. | |

FOREIGN PATENT DOCUMENTS

| | | | | |
|---|---|---|---|---|
| CN | 1960270 A | 5/2007 | | |
| EP | 1085750 A2 | 3/2001 | | |
| EP | 1562381 A1 | 8/2005 | | |
| JP | H11239179 A | 8/1999 | | |
| JP | 2004320302 A | * | 11/2004 | H04N 5/92 |
| JP | 2004320302 A | 11/2004 | | |
| KR | 20010050431 A | 6/2001 | | |
| KR | 20050079194 A | 8/2005 | | |
| WO | 2007000740 A1 | 1/2007 | | |
| WO | WO-2008061044 A2 | 5/2008 | | |
| WO | WO2011003079 A1 | 1/2011 | | |

OTHER PUBLICATIONS

Alvin Yau et al., "Cognitive Radio-based Wireless Sensor Networks: Conceptual Design and Open Issues", The 2nd IEEE Workshop on Wireless and Internet Services (WISe 2009) Zürich, Switzerland; Oct. 20-23, 2009. pp. 955-962.

Anh Tuan Hoang, et al., "Adaptive Scheduling of Spectrum Sensing Periods in Cognitive Radio Networks" Global Telecommunications Conference, 2007. Globecom '07. IEEE, IEEE, Piscataway, NJ, USA, Nov. 1, 2007 (Nov. 1, 2007), pp. 3128-3132, XP031196520 ISBN: 978-1-4244-1042-2 the whole document.

Ashwini Kumar, et al., "A Case Study of QoS Provisioning in TV-Band Cognitive Radio Networks", Computer Communications and Networks, ICCCN 2009, Proceedings of 18th Internatonal Conference on, IEEE, Piscataway, NJ, USA, Aug. 3, 2009 (Aug. 3, 2009), pp. 1-6, XP031527803, ISBN: 978-1-4244-4581-3.

Dong Chen, et al., "PHY 28-3—In-Band Sensing without Quiet Period in Cognitive Radio", Wireless Communications and Networking Conference, 2008, WCNC 2008, IEEE, Piscataway, NJ, USA, Mar. 31, 2008 (Mar. 31, 2008), pp. 723-728, XP031243718, ISBN: 978-1-4244-1997-5.

International Search Report and Written Opinion—PCT/US2011/020239, International Search Authority—European Patent Office—dated Mar. 29, 2011.

Yucek et al., "A Survey of Spectrum Sensing Algorithms for Cognitive Radio Applications", IEEE Communication Surveys and Tutorials, vol. 11, No. 1, First Quarter 2009. pp. 116-130.

Taiwan Search Report—TW100100411—TIPO—dated Nov. 6, 2013.

* cited by examiner

US 9,942,606 B2

APPLICATION LAYER MODIFICATION TO ENABLE TRANSMISSION GAPS

CROSS-REFERENCE TO RELATED APPLICATIONS

This application claims the benefit of: 1) U.S. Provisional Patent Application No. 61/292,391 filed Jan. 5, 2010, in the names Raveendran et al.; 2) U.S. Provisional Patent Application No. 61/298,494 filed Jan. 26, 2010, in the names Raveendran et al.; and 3) U.S. Provisional Patent Application No. 61/309,534 filed Mar. 2, 2010, in the names Raveendran et al., the disclosures of which are expressly incorporated herein by reference in their entireties. The present application is related to, and hereby incorporates by reference the disclosure of, concurrently-filed and commonly-assigned U.S. patent application Ser. No. 12/984,032 filed Jan. 4, 2011 titled "TRANSPORT LAYER MODIFICATION TO ENABLE TRANSMISSION GAPS".

BACKGROUND

Field

The present disclosure generally relates to television white space devices that are operable to communicate information over television white space and, more specifically, to systems and methods for operating a transmitter and a sensor in the television white space.

Background

The Federal Communications Committee (FCC) is an independent agency of the United States government that is charged with regulating all non-federal government use of the radio spectrum (including radio and television (TV) broadcasting), and all interstate telecommunications (wire, satellite and cable) as well as all international communications that originate or terminate in the United States. In 2008, the FCC issued rules approving the unlicensed signal operation in the unused TV channels (i.e., white space). However, this approved, unlicensed use is subject to protections set in place for the primary users of the TV band. The primary users of the TV band are ATSC/National Television System Committee (NTSC) transmitters, such as TV broadcasters, and licensed wireless microphones. The new rules allow wireless technologies to use the TV white space as long as the technology and any resulting signal transmissions do not interfere with the existing primary users. Thus, periodic sensing is required to detect other signals. For purposes of this disclosure, the various devices that utilize such technologies to access this TV white space will be referred to as "white space devices," "unlicensed devices," or the like.

Wireless delivery of content to televisions (TVs) and other monitors is desirable. As one example, it may be desirable, in some instances, to have content delivered from a user device for output on a TV device. For instance, as compared with many TV device output capabilities, many portable user devices, such as mobile telephones, personal data assistants (PDAs), media player devices (e.g., APPLE IPOD devices, other MP3 player devices, etc.), laptop computers, notebook computers, etc., have limited/constrained output capabilities, such as small display size, etc. A user desiring, for instance, to view a video on a portable user device may gain an improved audiovisual experience if the video content were delivered for output on a TV device.

Accordingly, a user may desire in some instances to deliver the content over white space from a user device for output on a monitor with an ATSC tuner (e.g., HDTV device) for an improved audiovisual experience in receiving (e.g., viewing and/or hearing) the content. However, the transmission to the television device over white space requires sensing which would interfere with the audiovisual experience.

SUMMARY

The present disclosure generally relates to white space devices that are operable to communicate information over white space and, more specifically, to systems and methods for quieting the transmitter for sensing existing signals in the television white space. In one embodiment, a method for inconspicuous quieting of a transmitter in a white space device includes inserting, from an application layer, data into a transport stream for transmission by the transmitter of the white space device to produce a null window of time. The null window of time does not contain essential information. The method also includes transmitting the transport stream by the transmitter of the television white space device. The method senses during the null window of time, by a white space sensor of the white space device, existing signals in the white space.

According to another aspect of the disclosure, a white space device has a transmitter configured to transmit multimedia data in a transport stream via white space. The white space device also has an application layer encoder configured to insert data into the transport stream to produce a null window of time. The white space device also has a white space sensor configured to sense signals in the white space during the null window of time.

In yet another aspect, a white space system includes means for inserting, from an application layer, data into a transport stream to produce a null window of time. The system also has means for transmitting the transport stream via white space; and means for quieting the transmitting means during the null window of time.

In a further aspect, a computer readable medium has program code recorded thereon for inconspicuous quieting of a transmitter of a white space device. The program code includes program code to insert, from an application layer, data into a transport stream to produce a null window of time. The program code also includes program code to transmit the transport stream via white space. The program code also includes program code to sense existing signals in the white space during the null window of time.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
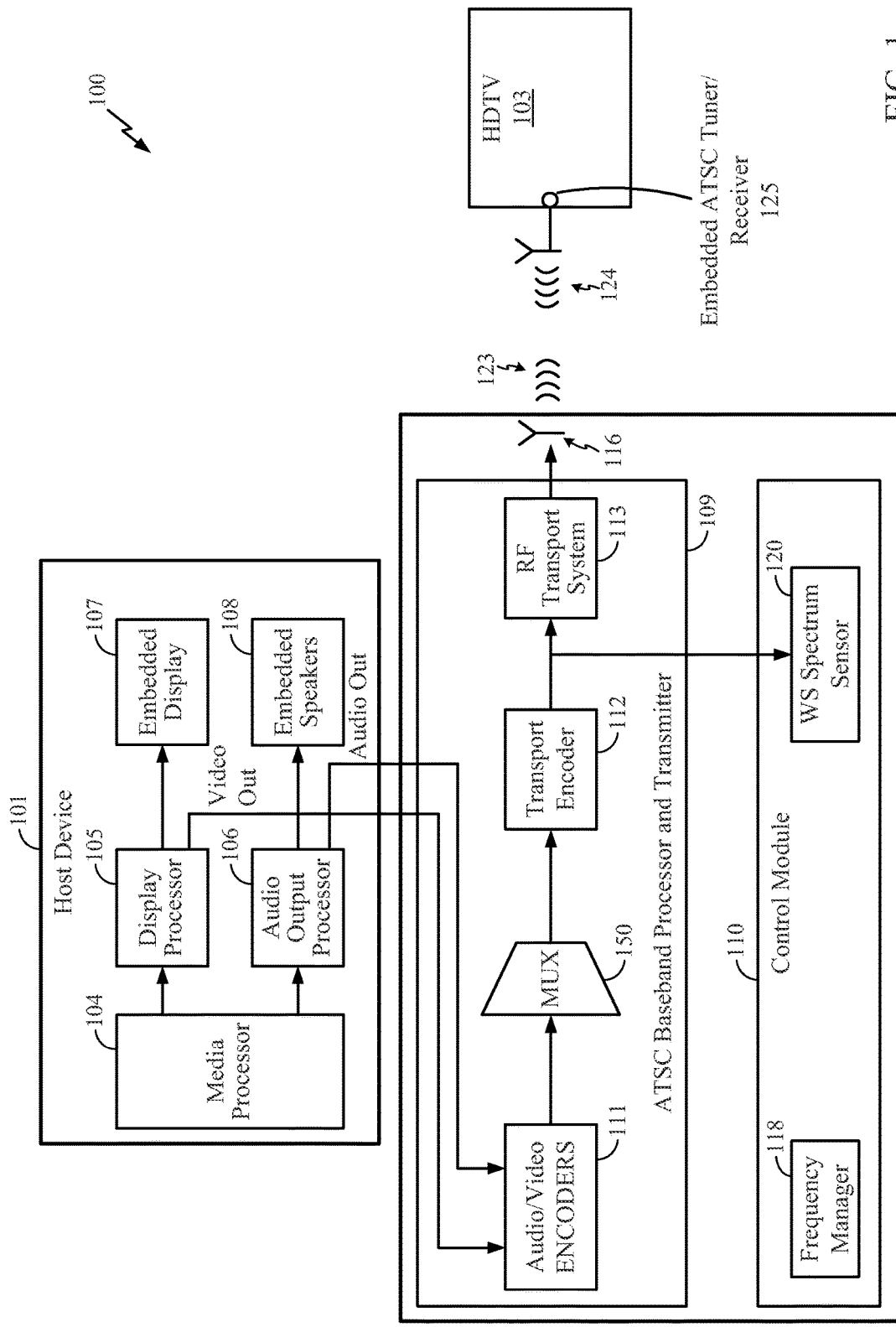
FIG. 1 is an illustration of an exemplary system within which embodiments of the present disclosure may be implemented.

The word "exemplary" is used herein to mean "serving as an example, instance, or illustration." Any embodiment described herein as "exemplary" is not necessarily to be construed as preferred or advantageous over other embodiments.

White space devices generally refer to unlicensed wireless transceivers that communicate over the unused spectrum in the television band. These devices generally operate in a cognitive manner in which the devices scan first to detect TV band signals (e.g., Advanced Television Systems Committee (ATSC), National Television Systems Committee (NTSC), and certain wireless microphone protocols) from licensed primary users and then select unused channels in order to avoid interference with the licensed signals.

A white space device may be communicatively coupled with or integrated within a user device, and the white space device may thus deliver information (e.g., multimedia content) from the user device to a TV receiver device (e.g., a HDTV device) over TV white space. Exemplary implementations of a white space device are described further herein. However, various implementations of such a white space device are possible, and any implementation of a white space device that is operable to deliver information from a user device over TV white space is within the scope of the present disclosure.

In order for white space devices to operate in white space, some sensing is performed (e.g., to identify/confirm the unused "white space" available in the TV band). Thus, a white space device quiets its transmitter for periodic intervals of time during which the sensing can be performed by the device. In one embodiment, "quieting" includes turning off the transmitter, while in other embodiments quieting includes filtering the transmission, switching the transmitting to a non interfering frequency or some other action that permits sensing to occur.

It becomes desirable to employ a method for quieting the transmitter in a manner that does not impact/degrade (or reduces/minimizes impact/degradation) on the quality of the transport stream being transmitted (e.g., to enable a high-quality audio/visual experience for a user). In other words, it is desirable to inconspicuously quiet the transmitter. This may be particularly desirable for applications involving real-time transmission/streaming of video, audio, and/or other content, such as in the case of a user desiring to have multimedia content of a video be delivered from a portable user device for output on a TV device (e.g., HDTV device) for an improved audiovisual experience.

Embodiments of the present disclosure are directed to quieting a white space device's transmitter for sensing white space signals. The quieting is performed in a manner that reduces or minimizes degradation to the transmitted transport stream (e.g., moving pictures expert group (MPEG)-2 transport stream (TS), Real-time Transport Protocol (RTP) transport stream, and Transport Control Protocol (TCP) stream) output by the white space device. Again, it is often necessary to quiet the transmitter periodically to allow for sensing to be performed by the white space device, and it is desirable to quiet the transmitter in a way that reduces or minimizes degradation of the transmission of the content contained in the transport stream being transmitted by the white space device (e.g., with reduced or minimal disruption to the real-time streaming of the audio/visual information being transmitted for display).

As discussed further herein, various techniques may be employed for managing the streaming of content (e.g., multimedia content) so as to allow for certain time frames that are available for quieting the transmitter inconspicuously (i.e., with reduced or minimal disruption to the audio/visual information being displayed on a receiving HDTV device). This will be referred to generally herein as "inconspicuous" transmitter quieting.

As discussed further below, embodiments of the present disclosure provide various implementations that employ application layer techniques for inconspicuous transmitter quieting within the white space device. Related U.S. patent application Ser. No. 12/984,032, filed Jan. 4, 2011, titled "TRANSPORT LAYER MODIFICATION TO ENABLE TRANSMISSION GAPS," the disclosure of which is expressly incorporated herein by reference in its entirety, describes exemplary transport layer techniques for modifying a transport stream for inconspicuous transmitter quieting within a white space device.

FIG. 1 is an illustration of an exemplary system 100 within which embodiments of the present disclosure may be implemented. The system 100 includes an exemplary user device 101, which may be referred to as a "host" device. An exemplary implementation of the user device 101 is shown in a block-diagram form in FIG. 1. In the illustrated example, the user device 101 is shown as a mobile device, but in other embodiments the user device 101 need not be a mobile device. The exemplary user device 101 generally includes one or more processors, such as a media processor 104, display processor 105, and/or audio output processor 106, and the user device 101 may have embedded input/output devices, such as an embedded display 107 and embedded speakers 108. Of course, the user device 101 may be configured differently in a given implementation (e.g., include different and/or additional functional blocks than those shown in FIG. 1), and any such implementation is within the scope of the present disclosure.

The user device 101 is generally operable to generate content, which may be output via its embedded output devices (e.g., embedded display 107 and speakers 108). Various types of content are well known in the art for being output on user devices, and any such content may be output on the user device 101 in a given application. For instance, a multimedia player application may be executing on the user device 101 to output multimedia content (e.g., a movie, etc.). Of course, other content, such as textual content and/or other graphical/image and/or audio content (e.g., email content, web browsing content, video gaming content, word processing content, etc.) may be output in a given application with which a user may be interacting via the user device 101.

The user may be inputting information to the user device 101 (e.g., for interacting with an application executing thereon) via one or more human interface input device(s) (not shown in FIG. 1), such as a pointer device (e.g., mouse), joystick, keyboard, touch-screen interface, microphone, etc. In some instances, such user input information may result in some output being generated or modified. For instance, input of a user's mouse movement may result in corresponding movement of a pointer on an embedded display 107 of the user device 101.

Also included in the exemplary system 100 is a white space device 102, an exemplary implementation of which is shown in a block-diagram form in FIG. 1. The white space device 102 is communicatively coupled with the user device 101 for receiving information from such user device 101. In one embodiment, the white space device 102 is a separate device, which may be referred to as a "dongle," that is communicatively coupled with the user device 101. The white space device 102 may be coupled via a USB connection, PCIe interface, or in any suitable manner that allows for information from the user device 101 to be captured by the white space device 102 as discussed further herein. For example, the white space device 102 may be communicatively coupled with the user device 101 via any suitable type of wired connection or via a wireless communication connection, such as wireless USB (WUSB), Bluetooth, 802.11, etc.

The white space device 102 captures information from the user device 101. For instance, the captured information includes content that is to be output via an output device, such as "video out" 126 and/or "audio out" 127, as shown in FIG. 1. As discussed further herein, other information may also be captured by the white space device 102 in certain embodiments, such as "human interface device" (HID) data, e.g., user-input commands (e.g., mouse movements, joystick movements, keyboard input, and/or other commands received via human interface device(s)). The white space device 102 is operable to wirelessly transmit by a transmitter 116 over wireless communication 123, via TV white space, information captured from the user device 101 to, for instance, allow the content (e.g., multimedia content) captured from the user device 101 to be received and output by a device, such as a monitor with an ATSC tuner, e.g., the high definition television (HDTV) 103 shown in FIG. 1.

In the illustrated example of FIG. 1, the white space device 102 transmits Advanced Television Systems Committee (ATSC) signals over the air on a white space channel, thereby effectively acting as a television station transmitter. Thus, as shown in block diagram form, the exemplary white space device 102 of FIG. 1 includes an ATSC baseband processor and transmitter 109. As is known in the art, ATSC is compatible with the well-known MPEG-2 Transport Stream (TS), and thus the exemplary white space device 102 includes audio/video decoders 111, e.g., MPEG-2/AC-3, for encoding the captured information from the user device 101. The encoded data is transmitted via a multiplexer 150 to a transport encoder 112, e.g., an MPEG-2 TS encoder. Subsequently, transport stream packets are sent to an RF transmission system 113 (and a transmitter (e.g., antenna) 116) for wireless transmission via white space 123.

The HDTV 103 includes an embedded wireless receiver 124 and ATSC tuner/receiver (e.g., a conventional television tuner) 125 such that it can receive and process the ATSC signals (e.g., the MPEG-2 TS) for output to the display and/or speakers of the HDTV device 103.

The exemplary white space device 102 of FIG. 1 further includes a control module 110 that has a white space spectrum sensor 120 for sensing the TV white space (e.g., for sensing signals within the TV whitespace). Such sensor 120 periodically performs sensing to determine the available TV white space. Frequency manager logic 118 can adjust the channel when needed to maintain the white space device's transmission within the determined available white space. As discussed further herein, embodiments are provided for inconspicuously quieting the transmitter 116 to enable the sensor 120 to perform its sensing during such quieting to improve the quality of sensing being performed Of course, ATSC is only one example of a set of television transmission standards that can be employed by the white space device 102, and in other embodiments any of a variety of television standards, such as ATSC standards, Digital Video Broadcasting (DVB) standards, Integrated Services Digital Broadcasting (ISDB) standards, Digital Multimedia Broadcast (DMB) standards, and the like can be employed to transmit media content over white space.

As mentioned above, the exemplary white space device 102 of FIG. 1 converts the information captured from user device 101 to a MPEG-2 transport stream for transmission, which is compatible with ATSC and thus can be received and processed by the ATSC receiver/tuner 125 of HDTV 103.

Exemplary Application Layer Implementations.

Various techniques may be employed for inconspicuously quieting a white space device's transmitter through techniques within the application layer in accordance with the present disclosure. Suppose, for instance, that a transmit stream rate of 30 frames per second (fps) is being utilized, which implies each frame is about 33 ms. Further suppose that a 10 ms window is desired within each second for sensing (e.g., by the white space sensor 120 of FIG. 1). The white space device's transmitter (e.g., the transmitter 116 of FIG. 1) is to be quieted for such 10 ms sensing window. It becomes desirable to employ application layer techniques to manage the streaming of content (e.g., multimedia content) from the white space device's transmitter so as to allow for such 10 ms windows to be available for quieting the transmitter inconspicuously (i.e., with reduced or minimal disruption to the multimedia information being transmitted for receipt and output on a receiving HDTV device). In some embodiments, the sensing occurs without actually quieting the transmitter.

ATSC defines one band of TV signals that may be used by a white space device 102 in certain embodiments. For transport, ATSC uses the MPEG-2 systems specification, known as an MPEG-2 transport stream, to encapsulate data, as discussed above. Three exemplary implementations for employing application layer techniques for enabling inconspicuous transmitter quieting within such MPEG-2 transport stream in accordance with embodiments of the present disclosure are discussed below.

Figure 2:
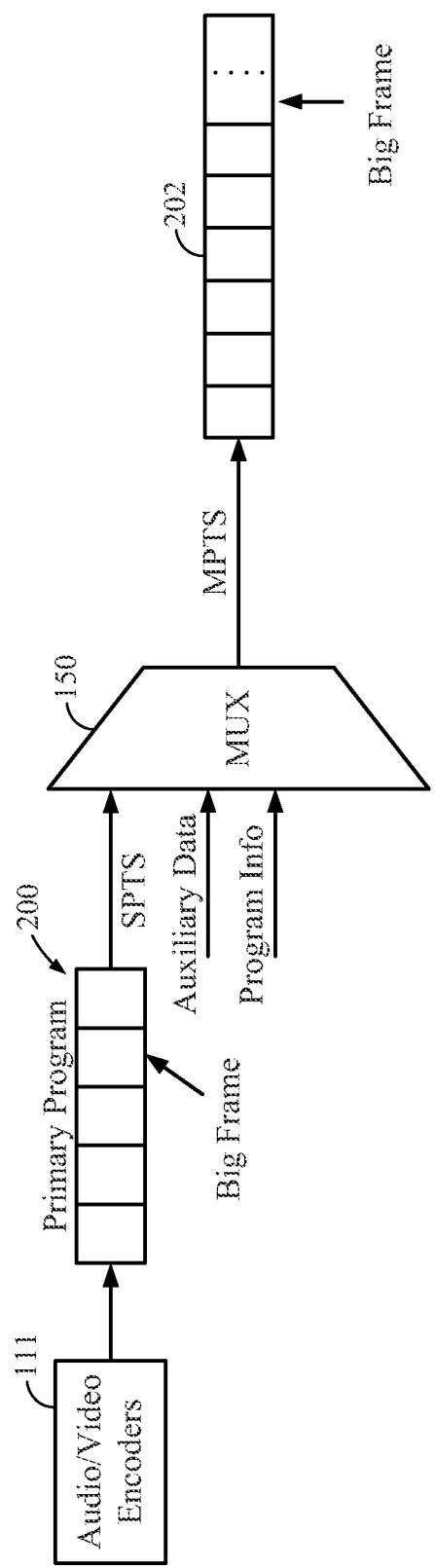
FIG. 2 is an illustration of an exemplary big frame declaration, according to one aspect of the present disclosure.

Exemplary Implementation 1 (Use of "Big Frame"):

As seen in FIG. 2, the video encoder 111 identifies a regular frame within the transport stream 200 as a "big frame", such that the receiver (e.g., the receiver 125 of FIG. 1) recognizes the frame as extending over at least one frame. When the big frame extends over multiple frames, because the regular frame actually only extends over a single frame, the additional frame (or at least a portion of the additional frame) is available as a "null" window of time that can be used for sensing. For instance, suppose that the frame rate is 30 fps. The 29th frame in each period can be declared (e.g., in its header) as a "big frame" so that it is buffered and utilized by the receiver 125 across two frame periods. Such designation of a frame as a "big frame" is supported by MPEG-2. In this way, the control module 110 can synchronize the sensing (e.g., by the sensor 120 of FIG. 1) with the occurrence of the 30th frame in each second. Because the "big frame" was transmitted in the $29^{th}$ frame period, no transmission is need at the $30^{th}$ frame period, i.e., the data from the $29^{th}$ frame is used in the $30^{th}$ frame period. This option is an encoding solution that does not depend on multiplexing.

In certain embodiments, rather than being fixed at a given position within the frame period, the position of a designated big frame may vary (e.g., randomly) within the frame period. The sensing (by the sensor 120) can likewise vary to be synchronized with the null window of time immediately following the regular frame that is designated as a big frame. The video encoders 111 designate the "big frame" and the control module 110 synchronizes sensing by the white space device 102 (e.g., by the sensor 120) with the occurrence of the "big frame."

Figure 3:
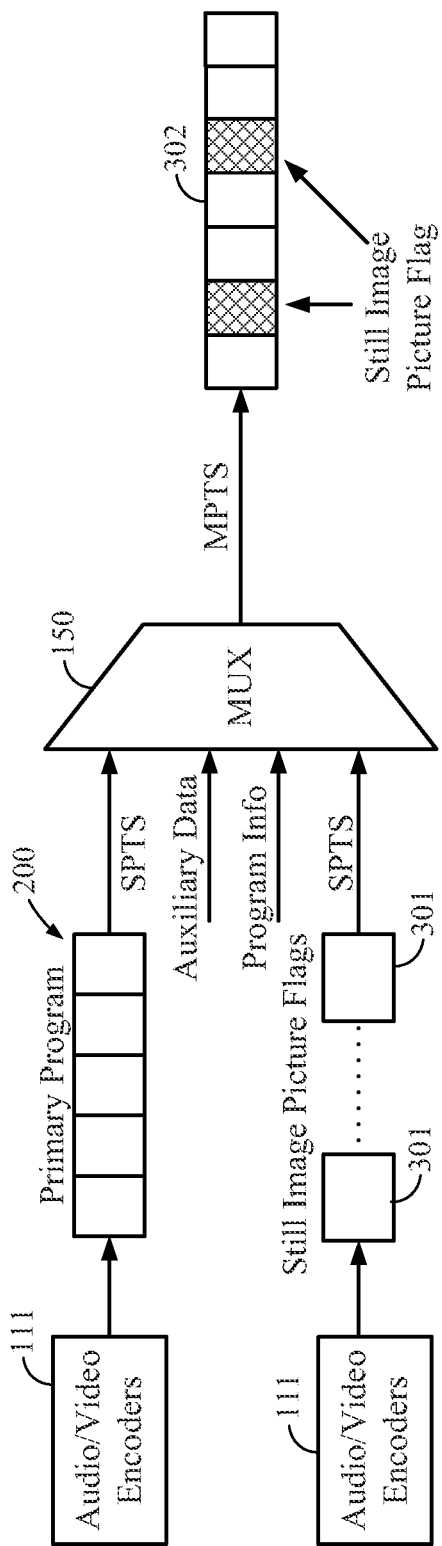
FIG. 3 is an illustration of an exemplary multiplexing, according to one aspect of the present disclosure.

Exemplary Implementation 2 (Use Still Image Picture Flag):

Another application layer technique includes a video encoder 111 transmitting an MPEG-2 transport stream's still image picture flag at a predefined time interval (e.g., for a 10 ms time interval every second) on a unique program ID. As seen in FIG. 3, this program 301 will be set to have a higher priority for multiplexing in the multiplexor 150 than the primary program 200. By multiplexing this higher priority program 301 containing the still image picture flag with the primary program 200, the modified transport stream 302 will include still image flags when the still image was inserted, indicated or believed to have been sent. The control module 110 can quiet the transmitter 116 (and initiate sensing) synchronized with portions of the stream 302 labeled with the still image picture flag. By using the still image picture flag, timing as well as audio can be disregarded. In this example, a still image is not actually sent. Rather, the quieting is synchronized with the timing of when the still image would be sent. Accordingly, not transmitting at this time will not affect the content displayed on the monitor.

Exemplary Implementation 3 (Insert Additional Program Having Certain Characteristics into the Stream):

Various techniques may be employed at the transport layer (e.g., by modifying the transport stream) for quieting the transmitter, such as those exemplary techniques disclosed in concurrently-filed and commonly-assigned U.S. patent application Ser. No. 12/984,032, filed Jan. 4, 2011, titled "TRANSPORT LAYER MODIFICATION TO ENABLE TRANSMISSION GAPS," the disclosure of which is expressly incorporated herein by reference. The transport stream may be modified in various ways, for example, to arrange a number of NULL packets together within the transport stream. For instance, a sensing window (e.g., of 10 ms) can be achieved by sending NULL data packets in the transport stream. The MPEG-2 multiplexer inserts null packets to make up for the required bandwidth. The position of these NULL packets could be modified in such a way that for a continuous period of, say 10 ms, no actual data is sent.

One way of ensuring a pre-determined number of null packets in the transport stream is to include an additional program (with a corresponding program ID or "PID") with NULL data and let the multiplexer 150 engineer the transport stream in such a way that this particular PID is always at a pre-determined position (e.g., at the end of each second). In certain embodiments, the video bit rate of such inserted program can change/vary.

Figure 4:
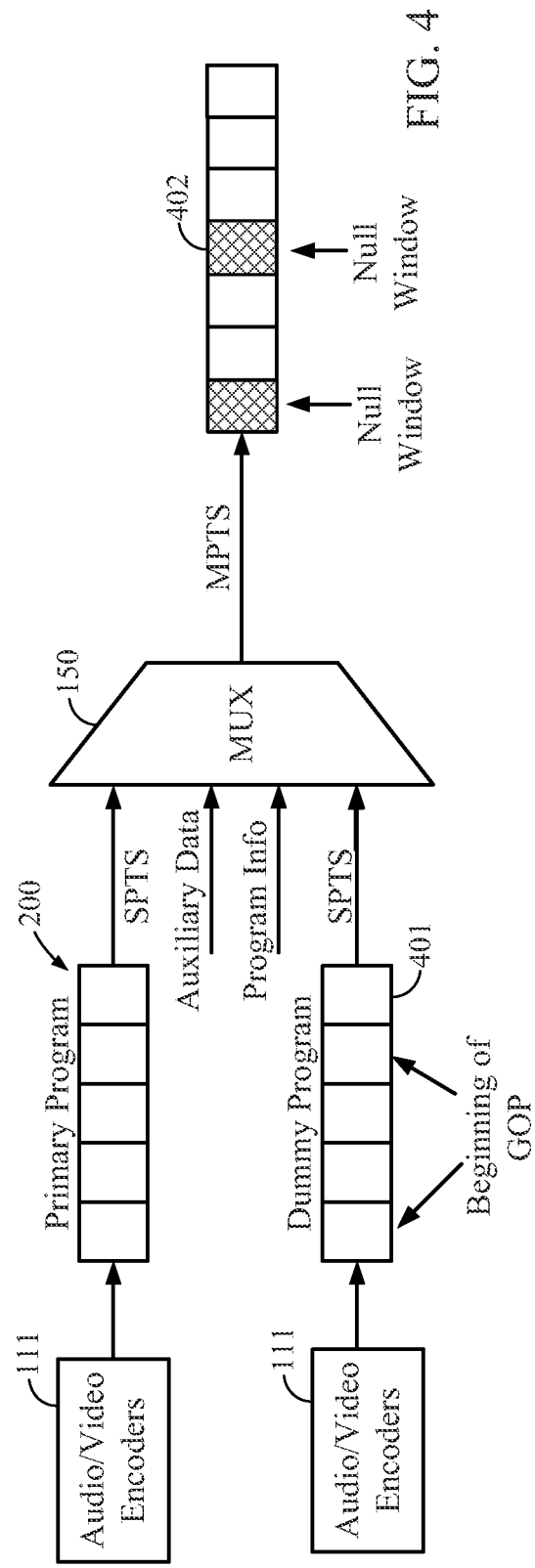
FIG. 4 is an illustration of an exemplary multiplexing, according to one aspect of the present disclosure.

However, rather than modifying the transport stream, various techniques for achieving a desired transmitter quieting period may be achieved through the application layer. For instance, in one embodiment, rather than multiplexing a program having a varying bit rate, FIG. 4 shows a dummy program 401 with static video input to the multiplexor 150, in addition to the primary program 200. The bit rate of the dummy program 401 matches the time interval of when sensing is to occur. The video encoder 111 creates the dummy program 401 with a fixed group of picture (GOP) structure. The GOP structure begins at the time when the sensing is to occur. The beginning of the GOP structure includes a higher priority frame, for example an I-frame. Thus, when multiplexing the dummy program 401 with the primary program 200, a null window results in the modified program 402 in sync with the beginning of each GOP structure. Quieting of the transmitter can be scheduled to occur in sync with the beginning of the GOP structure in the dummy program 401. Thus, the control module 110 can synchronize sensing with the fixed/static period of the added program 401. In other embodiments, the null window is formed at a time other than the beginning of each GOP structure.

Figure 5:
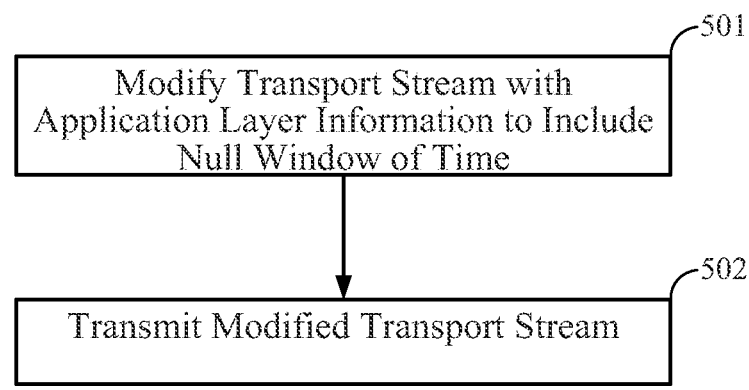
FIG. 5 shows an exemplary operational flow in accordance with one aspect of the present disclosure.

FIG. 5 shows an exemplary operational flow for inconspicuous quieting of a transmitter (e.g., transmitter 116 of FIG. 1) in a television white space device (e.g., the white space device 102 of FIG. 2) according to one embodiment of the present disclosure. In block 501 application layer information is inserted to create null windows of time in a modified transport stream. In block 502 the modified transport stream is transmitted. During these null windows of time, a white space transmitter is quieted, and sensing occurs to detect existing signals in the white space.

In one configuration, a television white space device has a means for inserting, from an application layer, information into a transport stream for transmission by the transmitter of the television white space communication device to produce a null window of time within the transport stream at a predetermined time. For instance, such means for inserting this information may be the video encoders 111.

The device may further have a means for transmitting the transport stream. For instance, a transmitter 116 as shown in FIG. 1 may be implemented. The device may further have a means for sensing signals in the white space during the null window of time, such as the white space sensor 120 of FIG. 1. The device may further include a means for quieting the transmitting means during the null window of time. For instance, the control module 110 may perform this quieting.

In one configuration, the means for inserting, from an application layer, information into the transport stream may include means for multiplexing with the transport stream a program with static video and a fixed GOP structure. For instance, the multiplexor 150 may multiplex, and the video encoders 111 may encode the static video.

In one configuration, the means for inserting, from an application layer, information into the transport stream may include means for multiplexing with the transport stream a program including still image picture indications. For instance, the multiplexor 150 may multiplex, and the video encoders 111 may insert the still picture indications.

In one configuration, the means for inserting, from an application layer, information into the transport stream may include means for declaring a regular frame present in a frame period of the transport stream as a big frame that is to encompass multiple frames, wherein a portion of the multiple frames forms the null window of time. For instance, the video encoders 111 may declare a frame as a big frame.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for inconspicuous quieting of a transmitter in a white space device, the method comprising:
   transmitting, via white space, content and data in a transport stream;
   inserting, from an application layer, the data into the transport stream during the transmission of the content, the data being transmitted by the transmitter of the white space device to produce a null window of time based at least in part on a big frame within the transport stream, a location of the big frame varying randomly within at least one frame period, the big frame comprising at least two existing frames, the two existing frames including a frame and the null window of time;
   quieting the transmitter during the null window of time; and
   sensing signals, by the white space device, during the null window of time.

2. The method of claim 1 in which the inserting, from the application layer, data into the transport stream further comprises:
   multiplexing with the transport stream a dummy program with static video and a fixed group of pictures (GOP) structure, to form the null window of time.

3. The method of claim 2, in which the null window of time starts at a beginning of each GOP structure.

4. The method of claim 1 in which the inserting, from the application layer, data into the transport stream further comprises:
   multiplexing with the transport stream a program including a portion flagged as a still image picture, to form the null window of time as corresponding with portions of the transport stream where the still image picture is indicated.

5. The method of claim 1 in which the transport stream comprises one of a moving pictures experts group (MPEG)-2 transport stream, a Real-time Transport Protocol (RTP) transport stream, and a Transport Control Protocol (TCP) stream.

6. A white space device comprising:
   a transmitter configured to transmit, via white space, content in a transport stream;
   an encoder configured to operate at an application layer and to insert data into the transport stream during the transmission of the content, the data being inserted into the transport stream to produce a null window of time based at least in part on a big frame within the transport stream, a location of the big frame varying randomly within at least one frame period, the big frame comprising at least two existing frames, the two existing frames including a frame and the null window of time;
a controller configured to quiet the transmitter during the null window of time; and
a white space sensor configured to sense signals in the white space during the null window of time.

7. The white space device of claim 6, further comprising a multiplexer configured to multiplex with the transport stream a dummy program with static video and a fixed group of pictures (GOP) structure.

8. The white space device of claim 6, further comprising a multiplexer configured to multiplex the transport stream with a program including a portion flagged as a still image picture, to form the null window of time as corresponding with portions of the transport stream where the still image picture is indicated.

9. The white space device of claim 6, in which the transport stream comprises a moving pictures experts group (MPEG)-2 transport stream.

10. The white space device of claim 6, in which the transport stream comprises a Real-time Transport Protocol (RTP) transport stream.

11. The white space device of claim 6, in which the transport stream comprises a Transport Control Protocol (TCP) stream.

12. A white space device comprising:
means for transmitting, via white space, data and content in a transport stream;
means for inserting, from an application layer, the data into the transport stream during the transmission of the content, the data being transmitted by a transmitter of the white space device to produce a null window of time based at least in part on a big frame within the transport stream, a location of the big frame varying randomly within at least one frame period, the big frame comprising at least two existing frames, the two existing frames including a frame and the null window of time;
means for quieting the transmitting means during the null window of time; and
means for sensing signals in the white space during the null window of time.

13. The white space device of claim 12 in which the means for inserting, from the application layer, data into the transport stream further comprises:
means for multiplexing with the transport stream a dummy program with static video and a fixed group of pictures (GOP) structure, to form the null window of time.

14. The white space device of claim 12 in which the means for inserting, from the application layer, data into the transport stream further comprises:
means for multiplexing the transport stream with a program including a portion flagged as a still image picture, to form the null window of time as corresponding with portions of the transport stream where the still image picture is indicated.

15. A non-transitory computer readable medium having program code recorded thereon for inconspicuous quieting of a transmitter of a white space device, the program code being executed by a processor and comprising:
program code to transmit, via white space, content and data in a transport stream;
program code to insert, from an application layer, the data into the transport stream during the transmission of the content, the data being transmitted by the transmitter of the white space device to produce a null window of time based at least in part on a big frame within the transport stream, a location of the big frame varying randomly within at least one frame period, the big frame comprising at least two existing frames, the two existing frames including a frame and the null window of time;
program code to quiet the transmitter during the null window of time; and
program code to sense existing signals, by the white space device, during the null window of time.

16. The non-transitory computer readable medium of claim 15, the program code further comprising program code to multiplex with the transport stream a dummy program with static video and a fixed group of pictures (GOP) structure, to form the null window of time.

17. The non-transitory computer readable medium of claim 15, the program code further comprising program code to multiplex with the transport stream a program including a portion flagged as a still image picture, to form the null window of time as corresponding with portions of the transport stream where the still image picture is indicated.

* * * * *